US012325567B2

(12) United States Patent
Dalmaso et al.

(10) Patent No.: US 12,325,567 B2
(45) Date of Patent: Jun. 10, 2025

(54) TAMPER-INDICATING DEVICE HAVING ROBOTIC APPLICATION FEATURES

(71) Applicant: BATTELLE SAVANNAH RIVER ALLIANCE, LLC, Aiken, SC (US)

(72) Inventors: Michael J. Dalmaso, Martinez, GA (US); Daniel Krementz, Augusta, GA (US); Richard E. Koenig, II, Evans, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 563 days.

(21) Appl. No.: 17/524,035

(22) Filed: Nov. 11, 2021

(65) Prior Publication Data

US 2023/0147819 A1 May 11, 2023

(51) Int. Cl.
*B65D 55/02* (2006.01)
*B65B 7/28* (2006.01)
(Continued)

(52) U.S. Cl.
CPC ............ *B65D 55/02* (2013.01); *B65B 7/2842* (2013.01); *B65D 7/045* (2013.01); *B65D 45/322* (2013.01); *G21F 5/12* (2013.01)

(58) Field of Classification Search
CPC ............... Y10T 292/51; Y10T 292/205; Y10T 292/207; Y10T 292/209; Y10T 292/212;
(Continued)

(56) References Cited

U.S. PATENT DOCUMENTS 1,937,864 A * 12/1933 Ashley, Jr. ............ F16B 41/005 292/327
2,080,685 A 5/1937 Ashe
(Continued)

FOREIGN PATENT DOCUMENTS

CN 110254912 A * 9/2019 ........... B65D 425/02
EP 0384135 A2 * 8/1990 ............ B65D 55/06
(Continued)

OTHER PUBLICATIONS

NL 1025858 C2 2005-05-09 PE2E Search machine translation (Year: 2024).*
(Continued)

*Primary Examiner* — Kristina R Fulton
*Assistant Examiner* — Steven A Tullia

(57) ABSTRACT

A tamper-indicating assembly for a drum enclosure assembly is provided. The tamper-indicating assembly includes a tamper-indicating device that defines a cavity sized to receive and surround at least a portion of the closure bolt, the first flanged end, and the second flanged end to prevent movement of the closure bolt. A tab extends radially outward from the tamper-indicating device with respect to an axial centerline of the tamper-indicating assembly. The tamper-indicating assembly further includes a pin non-removably coupled to the tamper-indicating device. The pin extends through the tamper-indicating device and across the cavity such that the tamper-indicating device and the pin collectively surround the closure bolt. The exemplary tamper-indicating device described herein includes features that facilitate the robotic application of the tamper-indicating device to a drum enclosure.

17 Claims, 9 Drawing Sheets

(51) Int. Cl.
*B65D 8/00* (2006.01)
*B65D 45/32* (2006.01)
*G21F 5/12* (2006.01)

(58) Field of Classification Search
CPC .......... Y10T 292/214; Y10T 292/1095; Y10T 292/48; Y10T 292/509; Y10T 292/528; Y10T 292/534; Y10T 292/62; Y10T 70/5566; Y10T 24/1441; Y10T 24/1443; Y10T 292/1099; Y10T 292/53; B65D 55/02; B65D 55/024; B65D 55/06; B65D 55/08; B65D 7/045; B65D 45/322; B65D 45/00; B65D 45/22; B65D 45/21; B65B 7/2842; G21F 5/12; G21F 5/06; E05B 17/2084; E05B 17/2092; E05B 39/00; E05B 39/02; E05B 65/0089; F16L 33/04; Y10S 292/53
USPC .............................. 220/328, 327; 292/243, 2
See application file for complete search history.

(56) References Cited

U.S. PATENT DOCUMENTS

| | | | | | |
|---|---|---|---|---|---|
| 3,587,700 | A * | 6/1971 | Mauer | B65D 45/32 | 220/655 |
| 4,076,291 | A * | 2/1978 | Pope | H02B 1/06 | 292/307 R |
| 4,120,182 | A * | 10/1978 | Michelman | E05B 65/0089 | 70/34 |
| 4,134,609 | A * | 1/1979 | Santoni | B65D 45/32 | 292/256.67 |
| 4,158,953 | A * | 6/1979 | Nielsen, Jr. | E05B 65/0089 | 70/164 |
| 4,329,860 | A * | 5/1982 | Moberg | G01R 11/04 | 70/164 |
| 4,331,012 | A * | 5/1982 | Swisher | G01R 11/02 | 70/164 |
| 4,957,317 | A * | 9/1990 | Jakubas | F16B 41/005 | 411/910 |
| 5,001,912 | A * | 3/1991 | DeWalch | G01R 11/04 | 70/164 |
| 5,005,883 | A | 4/1991 | Guiler | | |
| 5,127,687 | A | 7/1992 | Guiler | | |
| 5,333,747 | A * | 8/1994 | Wike | F16B 17/004 | 29/525.02 |
| 5,791,702 | A * | 8/1998 | Liroff | E05B 83/10 | 292/307 R |
| 5,878,604 | A * | 3/1999 | Stone | E05B 67/38 | 292/205 |
| 6,357,266 | B1 * | 3/2002 | Van Buren | E05B 77/44 | 70/56 |
| 6,435,576 | B1 * | 8/2002 | Kusta | B65D 45/32 | 292/256.65 |
| 6,536,815 | B1 | 3/2003 | Liroff | | |
| 6,846,024 | B1 * | 1/2005 | Palzkill | E05B 39/00 | 292/307 R |
| 7,038,585 | B2 | 5/2006 | Hall et al. | | |
| 7,159,733 | B2 | 1/2007 | Pickles | | |
| 7,438,334 | B2 | 10/2008 | Terry et al. | | |
| 7,650,767 | B2 * | 1/2010 | Robinson | G01R 11/04 | 70/164 |
| 7,883,127 | B2 | 2/2011 | Terry et al. | | |
| 8,544,902 | B2 | 10/2013 | Remark et al. | | |
| 8,960,737 | B2 | 2/2015 | Nazzari | | |
| 8,991,879 | B2 | 3/2015 | Debrody et al. | | |
| 10,577,156 | B2 | 3/2020 | Dagnelie et al. | | |
| 10,641,795 | B2 * | 5/2020 | DeWalch | G01R 11/04 | |
| 10,722,680 | B1 * | 7/2020 | Mench | B65D 55/024 | |
| 2006/0267355 | A1 | 11/2006 | Stachowiak, Jr. | | |
| 2007/0075553 | A1 * | 4/2007 | Lalancette | F16B 5/0275 | 292/256.67 |
| 2007/0138182 | A1 * | 6/2007 | Wild | F16J 13/24 | 220/293 |
| 2008/0290670 | A1 * | 11/2008 | DeWalch | G09F 3/0317 | 70/164 |
| 2009/0058105 | A1 | 3/2009 | Littrell et al. | | |
| 2009/0091144 | A1 * | 4/2009 | Debrody | G09F 3/0317 | 292/327 |
| 2010/0283578 | A1 | 11/2010 | Henderson | | |
| 2013/0247624 | A1 * | 9/2013 | DeWalch | F16B 31/021 | 70/164 |
| 2014/0213090 | A1 * | 7/2014 | Todd, II | G01R 11/04 | 439/301 |

FOREIGN PATENT DOCUMENTS

| | | | | |
|---|---|---|---|---|
| NL | 9201214 A * | 2/1994 | B65D 45/32 | |
| NL | 1025858 C2 * | 5/2005 | B65D 45/32 | |
| WO | WO-8502447 A1 * | 6/1985 | B25B 9/00 | |
| WO | WO 2006/018574 | 2/2006 | | |
| WO | WO-2007114949 A2 * | 10/2007 | F16B 2/08 | |

OTHER PUBLICATIONS

Clementi, et al. "Comparison of Tagging Technologies for Safeguards of Copper Canisters for Nuclear Spent Fuel" *Sensors* 18:929 (2018) pp. 1-17.

* cited by examiner

TAMPER-INDICATING DEVICE HAVING ROBOTIC APPLICATION FEATURES

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The subject matter of the present disclosure relates generally to a tamper-indicating device for use with a radioactive material drum enclosure. Particularly, the present disclosure relates to a tamper-indicating device having structural features that allow for robotic application.

BACKGROUND OF THE INVENTION

Containers and associated systems used to store and ship radioactive materials must be designed and demonstrated to safely contain the radioactive materials and limit personnel exposure, both under normal conditions and in a variety of accident scenarios. For example, the containers and associated systems may be subjected to a variety of tests demonstrating the ability to withstand normal conditions of transport, e.g., water spray test, free drop test, penetration test, compression test, or others, without the loss of any radioactive contents.

Generally, these engineered containers are in the form of cylindrically shaped drum enclosures that are used to confine the radioactive material for the purposes of transportation and storage. These engineered containers are typically referred to as "packagings" and must be secured in a way that provides adequate confinement of the radioactive material. Typically, the ends of the drums are closed utilizing standard bolted drum closure rings, welded fittings, and/or bolts to provide an adequate level of integrity for the package to meet safety and testing regulations required to ship radioactive material.

Once a drum enclosure containing radioactive material is closed and sealed, it is important the drum enclosure is not opened thereafter by any unauthorized personnel (e.g., the drum enclosure should only be opened by the intended recipient). Additionally, the intended recipient should be made aware if the drum enclosure has been opened or tampered with prior to receipt in order to take the appropriate safety precaution.

As such, a device for indicating whether or not the drum enclosure has been opened and/or tampered with would be useful and desired in the art. Particularly, a tamper-indicating device having one or more features that provide for robotic application onto the drum enclosure would be particularly useful.

BRIEF DESCRIPTION OF THE INVENTION

Aspects and advantages of the assemblies and methods in accordance with the present disclosure will be set forth in part in the following description, may be obvious from the description, or may be learned through practice of the technology.

In accordance with one embodiment, a tamper-indicating assembly for a drum enclosure assembly is provided. The drum enclosure assembly includes a drum body, a lid, and a lid ring. The lid ring extends from a first flanged end to a second flanged end. The lid ring secures the lid to the drum body. The drum enclosure assembly further includes a closure bolt having a head and a body that extends through the first flanged end and the second flanged end. The tamper-indicating assembly includes a tamper-indicating device that defines a cavity sized to receive and surround at least a portion of the closure bolt, the first flanged end, and the second flanged end to prevent movement of the closure bolt. A tab extends radially outward from the tamper-indicating device with respect to an axial centerline of the tamper-indicating assembly. The tamper-indicating assembly further includes a pin non-removably coupled to the tamper-indicating device. The pin extends through the tamper-indicating device and across the cavity such that the tamper-indicating device and the pin collectively surround the closure bolt.

In accordance with another embodiment, a method of applying a tamper-indicating assembly to a drum enclosure using a robotic system is provided. The drum enclosure assembly includes a drum body, a lid, and a lid ring. The lid ring extends from a first flanged end to a second flanged end, with the lid ring securing the lid to the drum body. The drum enclosure assembly further includes a closure bolt having a head and a body that extends through the first flanged end and the second flanged end. The method includes a step of gripping a tab of the tamper-indicating device with a gripping assembly of the robotic system. The method further includes a step of positioning the tamper-indicating device such that it at least partially surrounds the closure bolt by moving the gripping assembly with the robotic system. The tamper-indicating device defines a bore and further defines a cavity sized to receive at least a portion of the closure bolt. The method further includes a step of inserting a pin with an actuator of the robotic system into the bore and across the cavity such that the pin and the tamper-indicating device collectively surrounds the closure bolt.

These and other features, aspects and advantages of the present assemblies and methods will become better understood with reference to the following description and appended claims. The accompanying Figures, which are incorporated in and constitute a part of this specification, illustrate embodiments of the technology and, together with the description, serve to explain the principles of the technology.

BRIEF DESCRIPTION OF THE FIGURES

A full and enabling disclosure of the present invention, including the best mode thereof, directed to one of ordinary skill in the art, is set forth in the specification, which makes reference to the appended Figures, in which.

The use of the same or similar reference numerals in the figures denotes the same or similar features.

DETAILED DESCRIPTION OF THE INVENTION

Reference now will be made in detail to embodiments of the present methods and systems, one or more examples of which are illustrated in the Figures. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the Figures. Like or similar designations in the figures and description have been used to refer to like or similar parts of the invention. As used herein, the terms “first”, “second,” and “third” may be used interchangeably to distinguish one component from another and are not intended to signify location or importance of the individual components.

As used herein, the term “radially” refers to the relative direction that is substantially perpendicular to an axial centerline of a particular component, the term “axially” refers to the relative direction that is substantially parallel and/or coaxially aligned to an axial centerline of a particular component, and the term “circumferentially” refers to the relative direction that extends around the axial centerline of a particular component. Terms of approximation, such as “generally” or “about,” include values within ten percent greater or less than the stated value. When used in the context of an angle or direction, such terms include within ten degrees greater or less than the stated angle or direction. For example, “generally vertical” includes directions within ten degrees of vertical in any direction, e.g., clockwise or counterclockwise.

Figure 1:
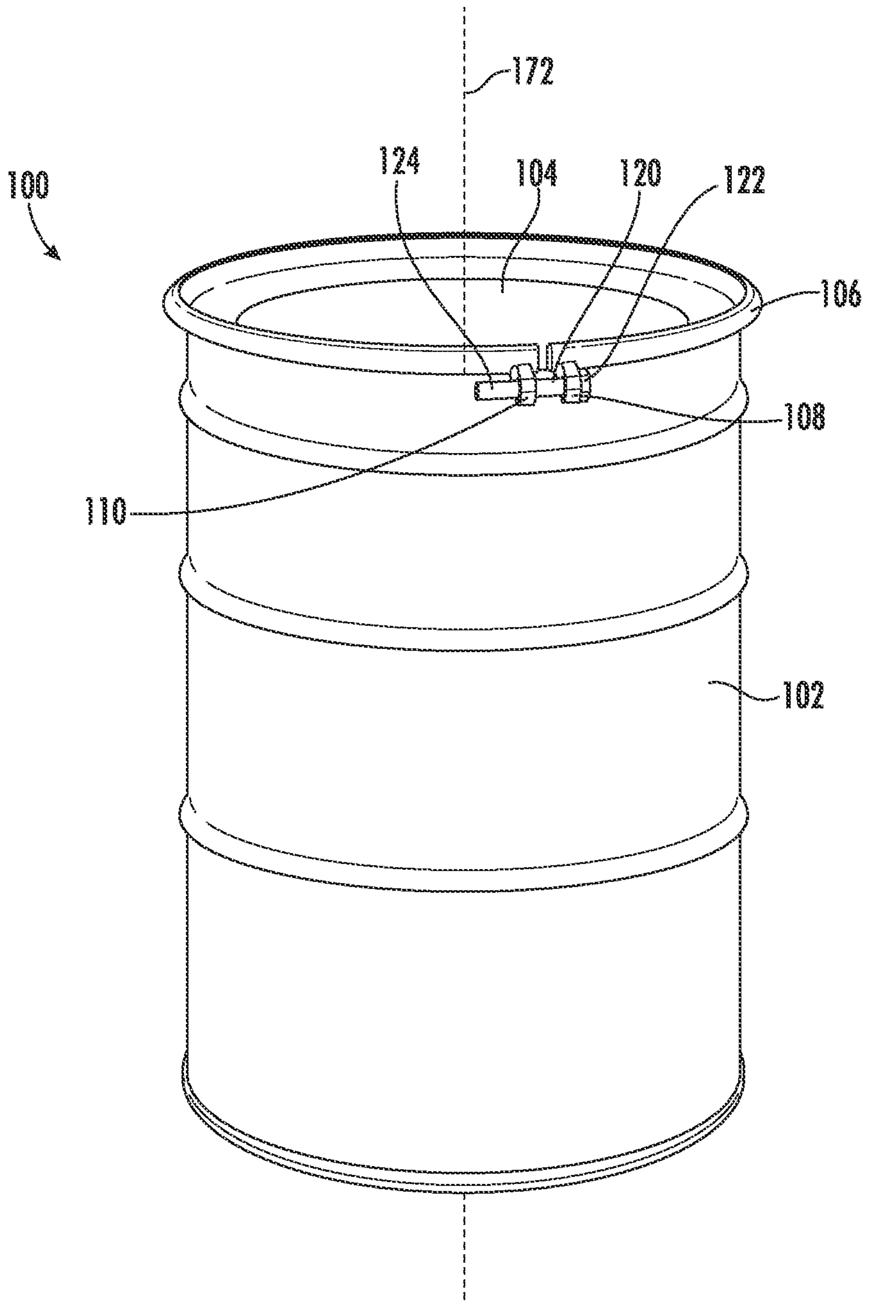
FIG. 1 is a perspective view of a drum enclosure assembly in accordance with embodiments of the present disclosure.
Figure 2:
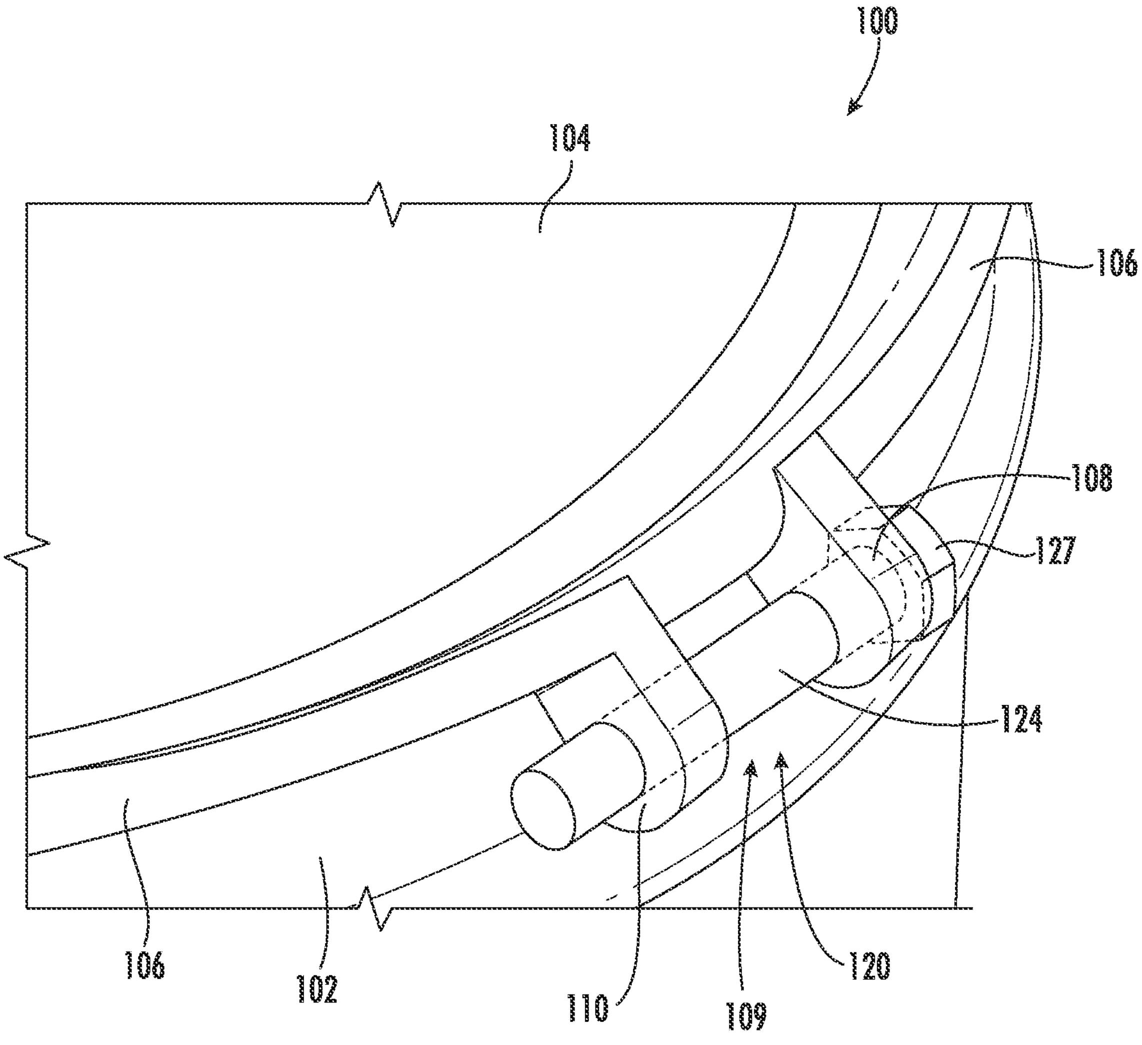
FIG. 2 is an enlarged view of an aspect of the drum enclosure assembly of FIG. 1 in accordance with embodiments of the present disclosure.
Figure 3:
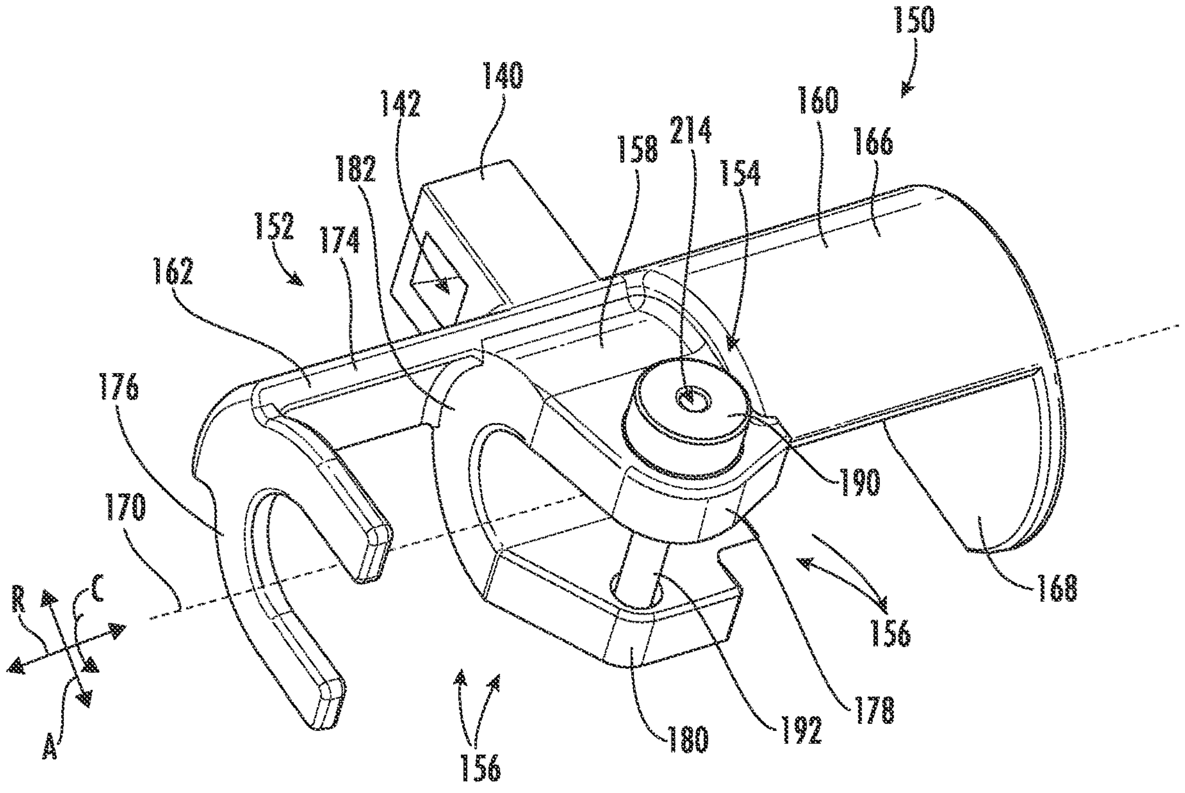
FIG. 3 is a perspective view of an exemplary tamper-indicating assembly in accordance with embodiments of the present disclosure.
Figure 4:
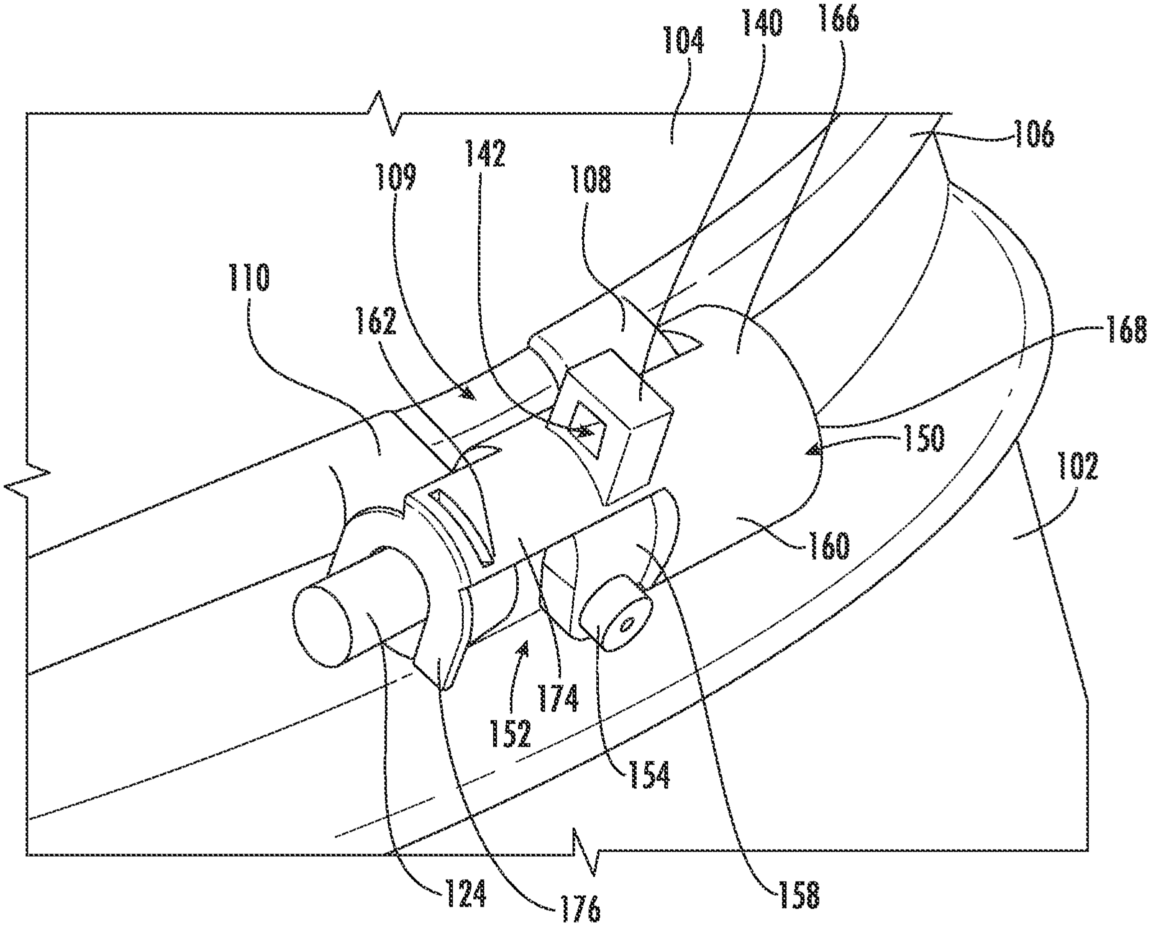
FIG. 4 is a perspective view of a tamper-indicating assembly coupled to a drum enclosure assembly in accordance with embodiments of the present disclosure.
Figure 5:
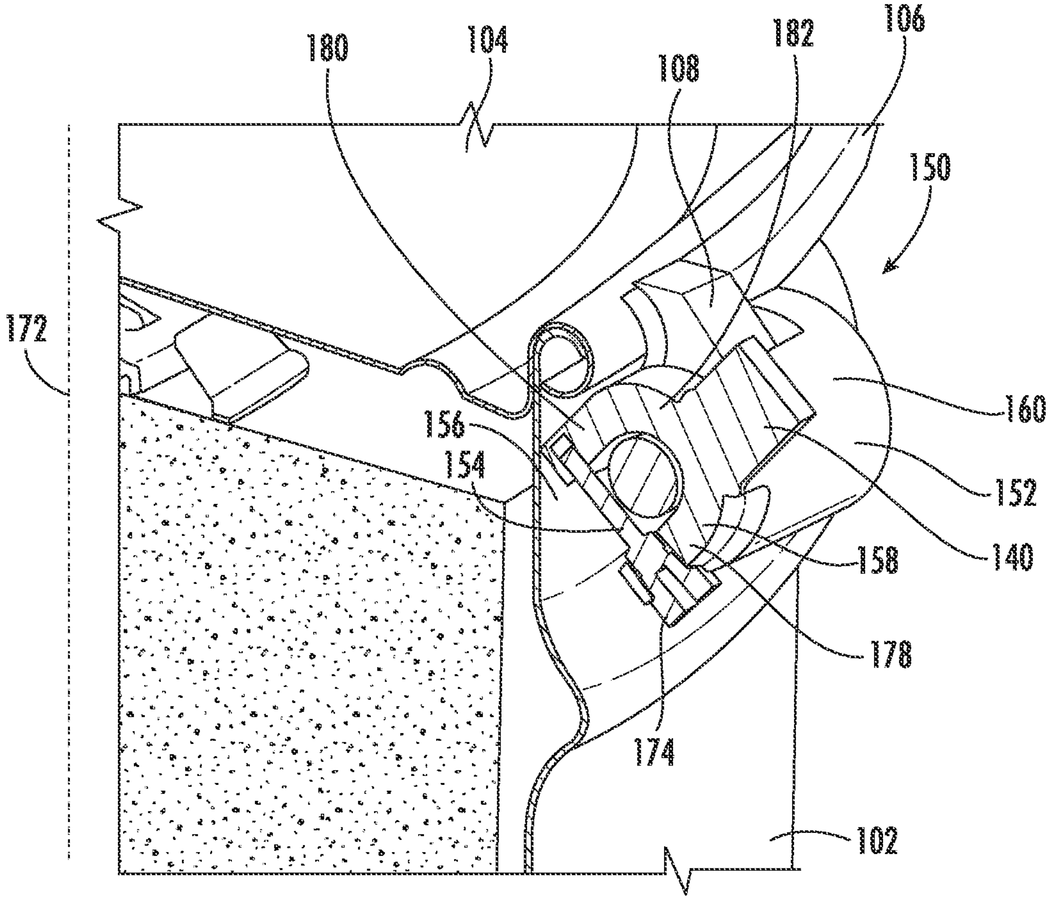
FIG. 5 is a cross-sectional view of the tamper-indicating assembly coupled to the drum enclosure assembly of FIG. 4 in accordance with embodiments of the present disclosure.

Referring now to the Figures, FIG. 1 illustrates a perspective view of a drum enclosure assembly 100, and FIG. 2 illustrates an enlarged perspective view of the drum enclosure assembly 100, in accordance with one or more aspects of the present disclosure. As shown, the drum enclosure assembly 100 may include a drum body 102, a lid 104, and a lid ring 106 securing the lid 104 to the drum body 102. For example, the drum body 102 may define one or more open ends, and the lid 104 may be disposed on the open end of the drum body 102, such that the lid 104 and the drum body 102 collectively define an enclosed interior (e.g., which may be used for storage or shipment of one or more products). The lid ring 106 may extend (e.g., annularly about an axial centerline 172 of the drum enclosure assembly 100) from a first flanged end 108 to a second flanged end 110. The first flanged end 108 and the second flanged end 110 may be spaced apart from one another such that a gap 109 is defined therebetween. A closure bolt 120 having a head 122 and a body 124 may extend through the first flanged end 108 and the second flanged end 110. For example, the body 124 of the closure bolt 120 may define exterior threads, and the flanges may define internal threads, such that rotation of the closure bolt 120 relative to the flanged ends 108, 110 adjusts the width of the gap 109 defined between the flanged ends 108, 110. In this way, the closure bolt 120 may be rotated to adjust the width of the gap 109 between the flanged ends 108, 110, which in turn increases the pressure applied by the lid ring 106 onto the lid 104 and the drum body 102, thereby securely coupling the lid 104 to the drum body 102. Thus, the closure bolt 120 couples the lid ring 106 and the lid 104 to the drum body 102, and the removal of the closure bolt 120 allows the lid 104 to be removed and the interior of the drum body 102 to be accessed.

FIGS. 2 through 8 each illustrate one or more exemplary aspects of a tamper-indicating assembly 150 in accordance with embodiments of the present disclosure. As shown by each of FIGS. 2 through 8, the tamper-indicating assembly 150 may include a tamper-indicating device 152 and a pin 154 configured to couple to a drum enclosure. In exemplary embodiments, the tamper-indicating assembly 150 may be non-removably coupled to the drum enclosure assembly 100. For example, as should be appreciated, once the tamper-indicating assembly 150 is coupled the drum enclosure assembly 100, it may not be removed without being destroyed (e.g., partially destroyed or entirely destroyed), thereby indicating to any subsequent handlers that the drum enclosure has been tampered with and potentially opened. Additionally, the tamper-indicating assembly 150 described herein may include one or more features that facilitate application entirely autonomously or robotically (such as via a robotic system 200). In this way, the tamper-indicating assembly 150 may be applied and engaged without requiring human contact or exposure to the drum enclosure, which may contain radioactive materials.

In exemplary embodiments, the tamper-indicating device 152 may define a cavity 156 sized to receive at least a portion of the closure bolt 120, the first flanged end 108, and the second flanged end 110 to prevent movement of the closure bolt 120. For example, the tamper-indicating device 152 may surround the closure bolt 120 and the flanged ends in order to prevent the closure bolt 120 from being moved or removed from the drum enclosure assembly 100 without destruction of the tamper-indicating device 152. For example, as shown in FIGS. 2 through 8, at least a portion of the closure bolt 120, the lid 104, the lid ring 106, and/or the drum body 102 may extend into the cavity 156 of the tamper-indicating device 152 (e.g., when the tamper-indicating assembly 150 is coupled to the drum enclosure assembly 100). In various embodiments, the cavity 156 of the tamper-indicating device 152 may correspond with or match a shape of at least a portion of the drum enclosure assembly 100, such that at least a portion of the drum enclosure assembly 100 may extend into the cavity 156 and make flush contact (e.g., continuous contact) with the tamper-indicating device 152.

In particular embodiments, the pin 154 may be non-removably coupled to the tamper-indicating device 152, such that it cannot be removed without destroying either or both of the pin 154 and/or the tamper-indicating device 152. Particularly, the pin 154 may extend through the tamper-indicating device 152 and across the cavity 156, such that the tamper-indicating device 152 and the pin 154 collectively surround the closure bolt 120 when attached to the drum enclosure assembly 100. In this way, the pin 154 ensures that the tamper-indicating assembly 150 may not be removed from the drum enclosure assembly 100 once coupled thereto.

In many embodiments, the tamper-indicating device 152 may further include a mid-body portion 158, a first arm 160 extending from the mid-body portion 158, and a second arm 162 extending from the mid-body portion 158 opposite the first arm 160. The mid-body portion 158 of the tamper-indicating device 152 may be disposed between the first arm 160 and the second arm 162, and both the first arm 160 and the second arm 162 may extend from the mid-body portion 158. The mid-body portion 158 may be sized to receive a portion of the closure bolt 120. For example, the mid-body portion 158 may be generally U-shaped, and a portion of the body 124 of the closure bolt 120 may extend through the cavity 156 defined by the U-shaped mid-body portion 158 of the tamper-indicating device 152. Stated otherwise, the mid-body portion 158 of the tamper-indicating device 152 may at least partially surround a portion of the body 124 of the closure bolt 120. Particularly, when coupled to the drum enclosure assembly 100, the mid-body portion 158 of the tamper-indicating device 152 may be disposed between the first flanged end 108 and the second flanged end 110 and may at least partially surround a portion of the body 124 of the closure bolt 120.

Both the first arm 160 and the second arm 162 may extend from the mid-body portion 158 of the tamper-indicating device 152 in opposite directions (e.g., generally axially with respect to the axial centerline 170 of the tamper-indicating assembly 150). For example, the first arm 160 may extend from the mid-body portion 158 and at least partially surround the first flanged end 108 and the head 122 of the closure bolt 120, and the second arm 162 may extend from the mid-body portion 158 and at least partially surround the second flanged end 110 and the body 124 of the closure bolt 120.

In exemplary embodiments, the first arm 160 may include an axial portion 166 and a radial wall 168 that prevents axial movement of the closure bolt 120. For example, the axial portion 166 of the first arm 160 may extend generally axially from the mid-body portion 158 of the tamper-indicating device 152 to the radial wall 168. Particularly, the axial portion 166 may extend from the mid-body portion 158, along the first flanged end 108 of the lid ring 106 and the head 122 of the closure bolt 120, to the radial wall 168. The radial wall 168 may prevent axial movement of the closure bolt 120 (e.g., the radial wall 168 may prevent the closure bolt 120 from being moved or removed without destruction of the tamper-indicating device 152). For example, the radial wall 168 may contact the head 122 of the closure bolt 120 to prevent the closure bolt 120 from being moved or removed from the flanged ends 108, 110. Particularly, the radial wall 168 may extend generally perpendicularly to the axial centerline 170 of the tamper-indicating assembly 150. The radial wall 168 impedes or blocks the closure bolt from being removed (e.g., unless the tamper-indicating device 152 is destroyed). For example, attempting to remove the closure bolt 120 while the tamper-indicating assembly 150 is in place would result in contact between the head 122 and the radial wall 168. If enough force is applied to the closure bolt 120, the radial wall 168 will be permanently destroyed, thereby indicating to users thereafter that the drum enclosure assembly 100 has potentially been opened and is unsafe to handle.

In many embodiments, the second arm 162 may extend opposite the first arm 160 and may at least partially surround the second flanged end 110 and the body 124 of the closure bolt 120. For example, the second arm 162 may include an axial portion 174 and a radial portion 176. Particularly, the axial portion 174 of the second arm 162 may extend from the mid-body portion 158, along the second flanged end 110 of the lid ring 106, to the radial portion 176 of the second arm 162. As shown, the radial portion 176 of the second arm 162 may be generally perpendicular to the axial portion 174 of the second arm 162 and may contact the second flanged end 110. In exemplary embodiments, the second flanged end 110, the first flanged end 108, and the head 122 of the bolt may be disposed between the radial wall 168 of the first arm 160 and the radial portion 176 of the second arm 162, in order to prevent removal of the closure bolt 120 when the tamper-indicating assembly 150 is coupled to the drum enclosure assembly 100. In various embodiments, the radial portion 176 of the second arm 162 may be generally U-shaped and may at least partially surround the body 124 of the closure bolt 120. For example, the U-shaped radial portion 176 of the second arm 162 allows the tamper-indicating device 152 to securely couple to the drum enclosure assembly 100 regardless of the excess length of the body 124 of the closure bolt 120 extending from the second flanged end 110 of the lid ring 106. Additionally, the radial portion 176 of the second arm 162 may extend along the second flanged end 110 of the lid ring 106, such that movement (or an attempted removal) of the closure bolt 120 would result in the head 122 of the closure bolt 120 engaging the radial wall 168, and in turn, the radial portion 176 of the second arm 162 engaging the second flanged end 110 of the lid ring 106.

As shown and described above, the tamper-indicating device 152 may be generally U-shaped. For example, the mid-body portion 158 of the tamper-indicating device 152 may further include a first side wall 178, a second side wall 180 extending generally parallel to the first side wall 178, and an end wall 182 extending between the first side wall 178 and the second side wall 180. Particularly, the mid-body portion 158 of the tamper-indicating device 152 may be disposed between the first flanged end 108 and the second flanged end 110 of the lid ring 106, and the mid-body portion 158 may at least partially surround the body 124 of the closure bolt 120. For example, the first side wall 178 may extend on a first side of the body 124 of the closure bolt 120, and the second side wall 180 may extend generally parallel to the second side wall 180 on an opposite side of the body 124 of the closure bolt 120. In this way, the body 124 of the closure bolt 120 may extend between the first side wall 178 and the second side wall 180. The end wall 182 may be curved in some embodiments (or may be straight in other embodiments) and may extend between the first side wall 178 and the second side wall 180.

Figure 6:
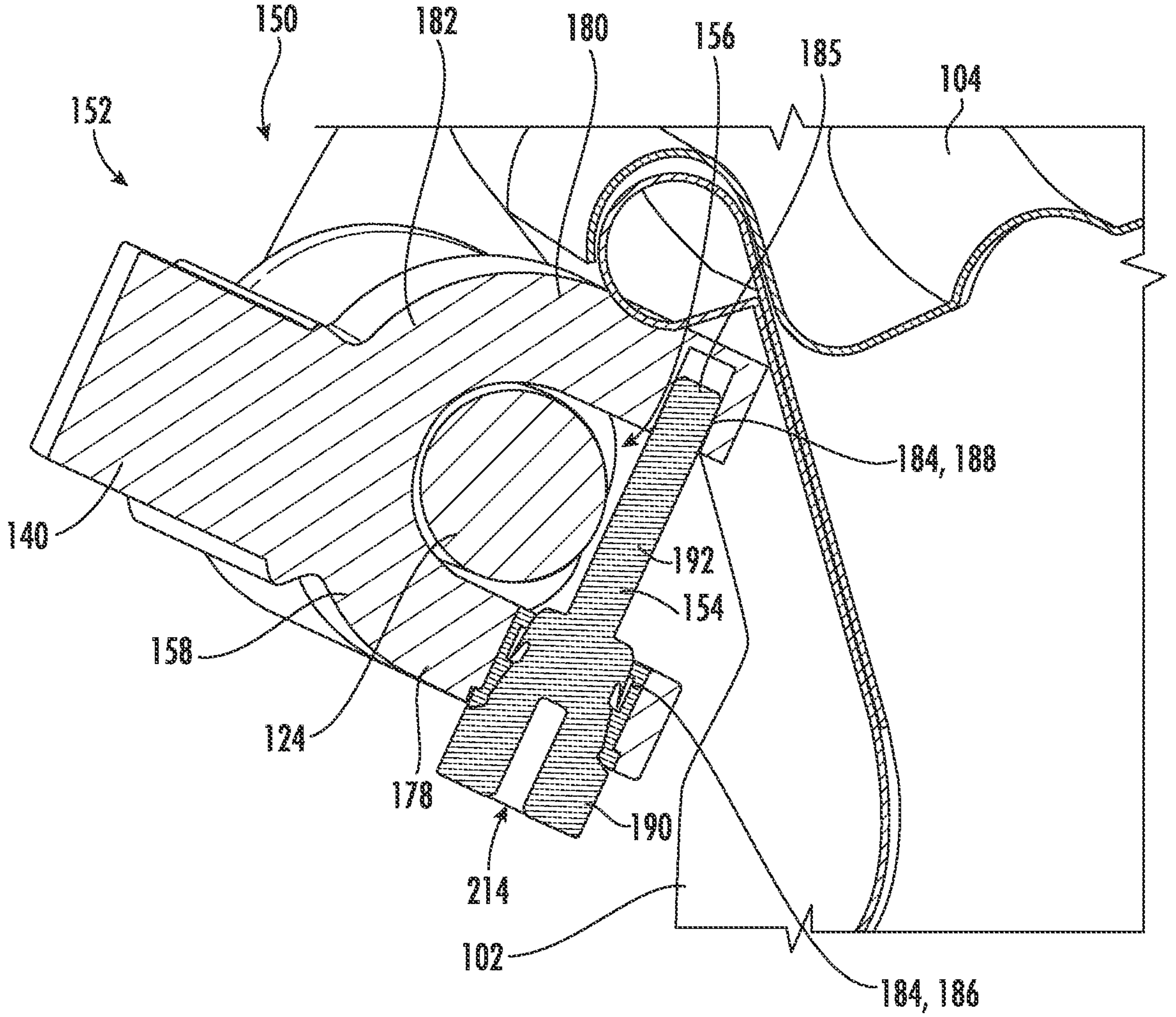
FIG. 6 is a cross-sectional view of a tamper-indicating assembly coupled to a drum enclosure assembly in accordance with embodiments of the present disclosure.
Figure 7:
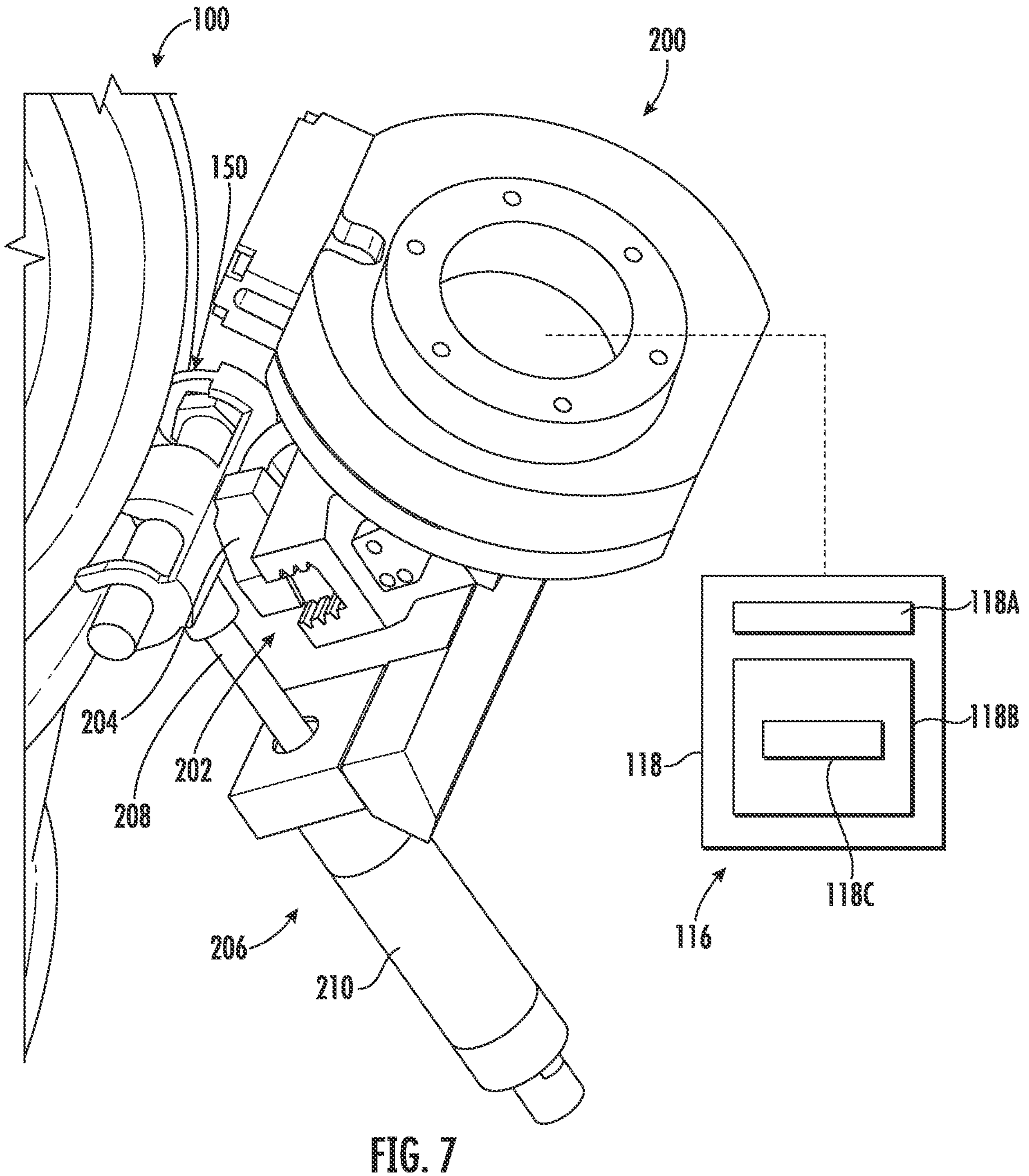
FIG. 7 is a perspective view of a robotic system being used to couple a tamper-indicating assembly to a drum enclosure assembly in accordance with embodiments of the present disclosure.
Figure 8:
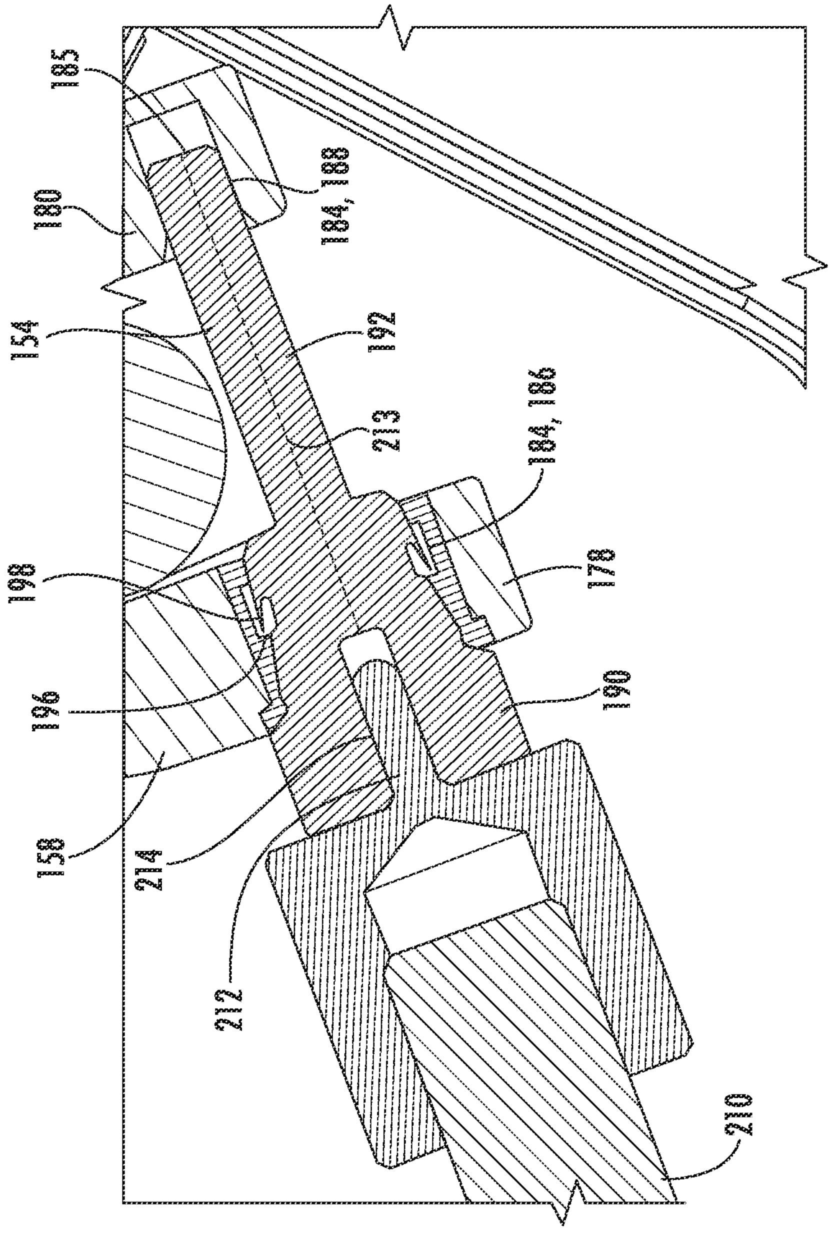
FIG. 8 is an enlarged cross-sectional view of the robotic system shown in FIG. 7 in accordance with embodiments of the present disclosure.

As shown in FIGS. 6 and 8, the tamper-indicating device 152 may further define a bore 184, and the pin 154 may be inserted into the bore 184 to couple the tamper-indicating assembly 150 to the drum enclosure assembly 100. For example, the bore 184 may be a drilled hole or aperture having a generally cylindrical shape that extends at least partially through the tamper-indicating device 152. In particular embodiments, the bore 184 may be defined in the mid-body portion 158 of the tamper-indicating assembly 150. Particularly, the bore 184 may include a first portion 186 defined in the first side wall 178 of the mid-body portion 158 and a second portion 188 defined in the second side wall 180 of the mid-body portion 158. The first portion 186 and the second portion 188 of the bore 184 may be coaxially aligned (such that the center point of the holes is along a common axis). As shown, once the pin 154 is inserted into the bore 184, the tip 185 of the pin 154 may be disposed within the second portion 188 of the bore 184, and the pin head 190 may be disposed in the first portion 186 of the bore 184. In various implementations, the pin 154 may extend through the first side wall 178, across the cavity 156, and into the second side wall 180. For example, in many embodiments, the pin 154 may include a pin head 190 and a pin body 192 extending from the pin head 190 to the tip 185. Particularly, the pin head 190 may be disposed in the first side wall 178 (e.g., within the first portion 186 of the bore 184), the pin body 192 may extend across the cavity 156 and into the second side wall 180 (e.g., within the second portion 188 of the bore 184), and the pin 154 may terminate at the tip 185 within the second portion 188 of the bore 184. In various embodiments, one or both of the pin 154 and/or the bore 184 may include threads. For example, the pin 154 may define external threads of the pin body 192, and the bore 184 may define internal threads corresponding to the external threads of the pin 154.

As shown in FIG. 8, the pin 154 and/or tamper-indicating device 152 may include one or more retention features that prevent removal of the pin 154 from the tamper-indicating device 152 without destruction of either the pin 154 and/or the tamper-indicating device 152. For example, the bore 184 may further include an annular retention wall 196, and the pin 154 may include a fin 198 that engages the annular retention wall 196 upon removal from the bore 184. In many embodiments, the fin 198 may extend from the pin head 190 of the pin 154 towards the annular retention wall 196. As shown, the annular retention wall 196 may extend radially inward generally perpendicularly with respect to an axial centerline 213 of the pin 154 (FIG. 8). The fin 198 may extend radially outwardly from the pin head 190 at an angle, such that the pin head 190 may be inserted into the bore 184 but not removed without destroying the fin 198 and/or the annular retention wall 196. In this way, the pin 154 may be non-removably coupled to the tamper-indicating device 152, such that once the pin 154 is inserted into the bore 184 and the fin 198 engages the annular retention wall 196, the pin 154 may not be removed without destruction thereof. In exemplary implementations, the fin 198 may extend radially outwardly from the pin head 190, and the annular retention wall 196 may be in the first portion 186 of the bore 184 (e.g., defined by the first side wall 178 of the mid-body portion 158 of the tamper-indicating device 152).

In many implementations, the tamper-indicating assembly 150 may be applied to the drum enclosure assembly 100 entirely autonomously or robotically (e.g., via a robotic system 200). In such implementations, the robotic system 200 may be capable of movement and/or rotation in all directions (e.g., six degrees of freedom) to translate and/or rotate the components of the tamper-indicating assembly 150 during the application thereof onto a drum enclosure assembly 100. For example, the robotic system 200 may include one or more actuators, motors, or other suitable structure to facilitate the movement thereof. Additionally, the robotic system 200 may include one or more systems configured to interact with elements of the tamper-indicating assembly 150, and the one or more systems may each be in operable communication with a controller. Specifically, the robotic system 200 may include a gripping assembly 202 having gripper arms 204 configured to couple to the tamper-indicating device 152, and the controller may be in operable communication (e.g., wired or wireless electrical communication) with the gripping assembly 202 to actuate the gripper arms 204 between an open position and a closed position. Additionally, the robotic system 200 may include an actuator 206 (such as an electric actuator, hydraulic actuator, pneumatic actuator, or other suitable actuator that provides for linear movement) configured to couple to the pin 154, and the actuator 206 may be in operable communication with the controller to adjust a linear position of the pin 154. The actuator 206 may include a rod 208 and a housing 210, and the rod 208 may be linearly movable relative to the housing 210 based on a signal received from the controller.

Referring particularly to the operation of the controller 116, in at least certain embodiments, the controller 116 can include one or more computing device(s) 118. The computing device(s) 118 can include one or more processor(s) 118A and one or more memory device(s) 118B. The one or more processor(s) 118A can include any suitable processing device, such as a microprocessor, microcontroller, integrated circuit, logic device, and/or other suitable processing device. The one or more memory device(s) 118B can include one or more computer-readable media, including, but not limited to, non-transitory computer-readable media, RAM, ROM, hard drives, flash drives, and/or other memory devices.

The one or more memory device(s) 118B can store information accessible by the one or more processor(s) 118A, including computer-readable instructions 118C that can be executed by the one or more processor(s) 118A. The instructions 118C can be any set of instructions that, when executed by the one or more processor(s) 118A, cause the one or more processor(s) 118A to perform operations. In some embodiments, the instructions 118C can be executed by the one or more processor(s) 118A to cause the one or more processor(s) 118A to perform operations, such as any of the operations and functions for which the controller 116 and/or the computing device(s) 118 are configured, the operations for operating the robotic system 200, as described herein, and/or any other operations or functions of the one or more computing device(s) 118. The instructions 118C can be software written in any suitable programming language or can be implemented in hardware. Additionally, and/or alternatively, the instructions 118C can be executed in logically and/or virtually separate threads on processor(s) 118A.

In exemplary embodiments, the tamper-indicating assembly 150 may include features that enable the tamper-indicating assembly 150 to be applied via a robotic system 200 (such as the robotic system 200 described herein). This may advantageously increase the production turnaround time and reduce exposure to the potentially harmful (e.g., radioactive) contents to be housed in the drum enclosure assembly 100. For example, in many embodiments, the tamper-indicating device 152 may include a tab 140 that extends radially outward from the tamper-indicating device 152 with respect to an axial centerline 170 of the tamper-indicating assembly 150. The tab 140 may enable the tamper-indicating device 152 to be gripped (or held) by the robotic system 200 (e.g., via the gripping assembly 202 of the robotic system 200). For example, the gripper arms 204 of the gripping assembly 202 may pick up (or couple to) to the tab 140 of the tamper-indicating device 152 when in a closed position, and the gripper arms 204 of the gripping assembly 202 may release the tab 140 of the tamper-indicating device 152 when in an open position.

Particularly, the tab 140 may extend from the tamper-indicating device 152 at an angle, in order to allow the robotic system 200 to approach and apply the tamper-indicating device 152 to the drum enclosure assembly 100 without striking the drum enclosure assembly 100, and in order to leave sufficient space for the pin 154 to be inserted by the actuator 206 of the robotic system 200. For example, the tab 140 may be generally oblique to an axial centerline 172 of the drum enclosure assembly 100 in order to facilitate application of the tamper-indicating assembly 150 via the gripping assembly 202 of the robotic system 200. In many embodiments, the tab 140 may form an angle with the axial centerline 172 of the drum enclosure assembly 100 that is between about 10° and about 80°, or such as between about 15° and about 70°, or such as between about 20° and about 60°, or such as between about 25° and about 50°.

In exemplary embodiments, as shown, the tab 140 may extend from the mid-body portion 158 of the tamper-indicating device 152. However, in other embodiments (not shown), the tab 140 may extend from one of the first arm 160 or the second arm 162. In particular, the tab 140 may extend from the end wall 182 of the mid-body portion 158 away from the pin 154. For example, the tab 140 may extend from an opposite side of the end wall 182 as the first side wall 178 and the second side wall 180 (but along the same direction). In this way, the first side wall 178 and second side wall 180 may extend from the end wall 182 towards the body 124 of the closure bolt 120, and the tab 140 may extend from the end wall 182 away from the body 124 of the closure bolt 120.

Additionally, the tab 140 may define a recessed surface 142. For example, the recessed surface 142 may extend generally axially with respect to the axial centerline 170 of the tamper-indicating assembly 150. More particularly, the tab 140 may be shaped generally as a rectangular prism having mostly planar (or flat) sides and extending radially from the mid-body portion 158 of the tamper-indicating device 152, and at least one of the surfaces of the tab 140 may include the recessed surface 142 (e.g., sunken or otherwise defining a cavity 156 within the tab 140). In exemplary implementations, one of the gripper arms 204 of the gripping assembly 202 may extend into the recessed surface 142 when coupling to the tab 140 of the tamper-indicating device 152.

In many embodiments, the pin 154 may be oriented generally perpendicular (e.g., within ±30° of perpendicular, or such as within ±20° of perpendicular, or such as ±10° of perpendicular) to the tab 140. This may enable the pin 154 to be inserted into the bore 184 via the actuator 206 of the robotic system 200 without being impeded by other elements of the drum enclosure assembly 100. Additionally, the pin head 190 may define an aperture 214 extending at least partially along an axial centerline 213 of the pin 154. In various operational implementations, the rod 208 of the actuator 206 may include a tip 212 sized and shaped to be inserted into the pin 154 to removably couple thereto. For example, the tip 212 may couple to the aperture 214 of the pin 154, and once the actuator 206 has inserted the pin 154 into the tamper-indicating device 152 during installation, the tip 212 may slide out of the aperture 214 to decouple from the pin 154.

Figure 9:
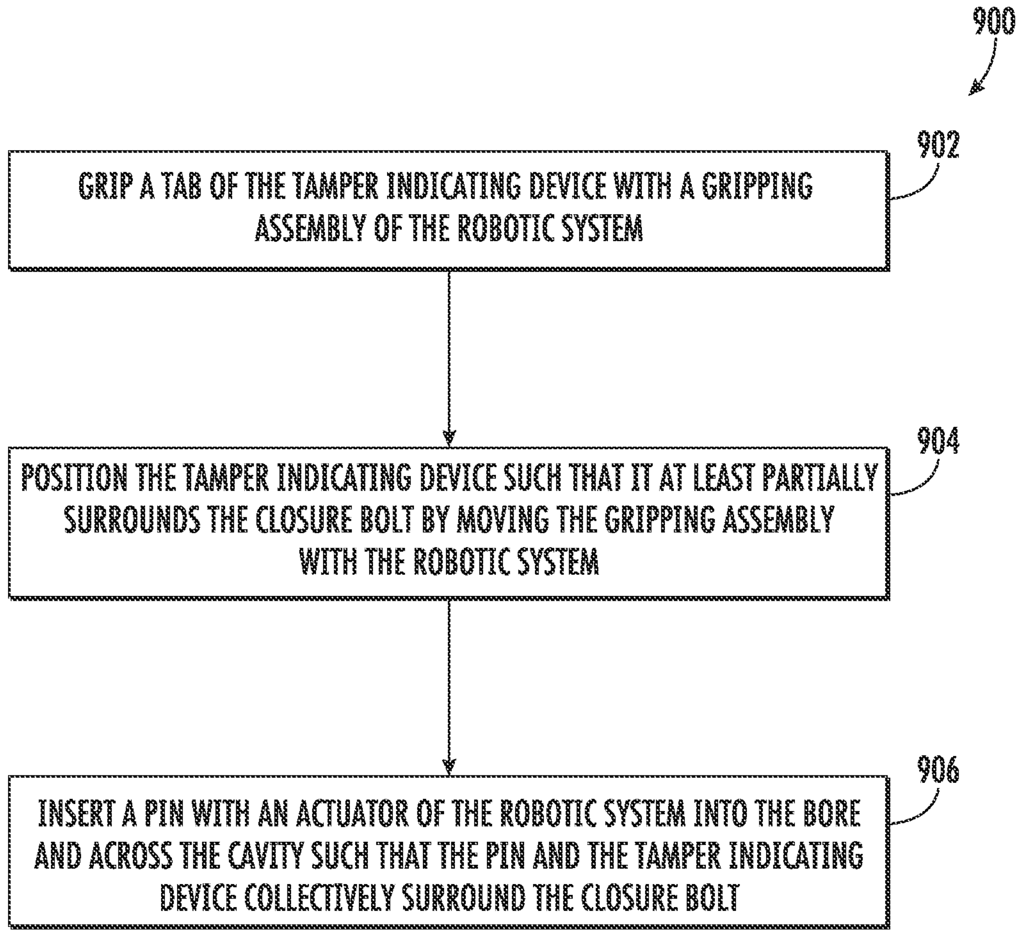
FIG. 9 is a flow chart of a method of applying a tamper-indicating assembly to a drum enclosure using a robotic system in accordance with embodiments of the present disclosure.

Referring now to FIG. 9, a flow diagram of one embodiment of a method 900 of applying a tamper-indicating assembly 150 to a drum enclosure using a robotic system 200 is illustrated in accordance with aspects of the present subject matter. In general, the method 900 will be described herein with reference to the tamper-indicating assembly 150, the drum enclosure assembly 100, and the robotic system 200 described above. Additionally, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

In exemplary embodiments, the method 900 may include a step 902 of gripping a tab 140 of the tamper-indicating device 152 with a gripping assembly 202 of the robotic system 200. For example, the gripping assembly 202 may include gripper arms 204 configured to move between an open position and a closed position based on a signal received from the controller. The gripper arms 204 may be moved into a position proximate to the tab 140 in an open position and may subsequently be actuated to a closed position to couple to the tab 140 of the tamper-indicating device 152. In this way, the gripping assembly 202 may be used for holding or coupling to the tamper-indicating device 152 in order to subsequently move and apply (e.g., install) the tamper-indicating device 152 onto the drum enclosure assembly 100.

In many embodiments, the method 900 may further include a step 904 of positioning (e.g., by translating and/or rotating the gripping assembly 202 of the robotic system 200) the tamper-indicating device 152 such that it at least partially surrounds the closure bolt 120 by moving the gripping assembly 202 with the robotic system 200. As discussed above, the tamper-indicating device 152 may define a cavity 156 sized to receive at least a portion of the closure bolt 120 and a bore 184. The robotic system 200 may translate and/or rotate the tamper-indicating device 152 (e.g., by translating and/or rotating the gripping assembly 202) relative to the drum enclosure assembly 100 to a position in which at least a portion of the first flanged end 108, the second flanged end 110, and the closure bolt 120 are disposed within the cavity 156 (such as the position of the tamper-indicating assembly 150 shown in FIGS. 4 through 7). For example, step 904 may optionally include positioning the first arm 160 of the tamper-indicating device such that it at least partially surrounds the first flanged end 108 and the head 122 of the closure bolt 120. Additionally, or alternatively, step 904 may optionally include positioning the second arm 162 of the tamper-indicating device 152 such that the second arm 162 at least partially surrounds the second flanged end 110 and the body 124 of the closure bolt 120.

In various embodiments, the method 900 may further include a step 906 of inserting a pin 154 with an actuator 206 of the robotic system 200 into the bore 184 and across the cavity 156 such that the pin 154 and the tamper-indicating device 152 collectively surround the closure bolt 120. For example, the pin 154 may be removably attached to the rod 208 of the actuator 206 via a tip 212 inserted into an aperture 214 defined by the pin head 190, such that the pin 154 is linearly movable with the rod 208 of the actuator 206. Once the tamper-indicating device 152 is moved into position by the robotic system 200 and/or gripping assembly 202, the actuator 206 may linearly move the pin 154 into the bore 184 until the fin 198 on the pin head 190 is beyond the annular retention wall 196 defined by the bore 184 (i.e., until the fin 198 engages the annular retention wall 196). At which point, the rod 208 of the actuator 206 may be removed from the pin 154 by linearly moving the rod 208 away from the tamper-indicating device 152, which will cause the fin 198 to contact the annular retention wall 196, and in turn, cause the tip 212 of the rod 208 to slide out of the aperture 214.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tamper-indicating system comprising:

a drum enclosure assembly including a drum body, a lid, a lid ring extending from a first flanged end to a second flanged end, the lid ring securing the lid to the drum body, a closure bolt having a head and a body extending through the first flanged end and the second flanged end; and a tamper-indicating assembly comprising:

a tamper-indicating device defining a cavity sized to receive and surround at least a portion of the closure bolt, the first flanged end, and the second flanged end to prevent movement of the closure bolt, wherein the tamper-indicating device includes a mid-body portion, a first arm extending from the mid-body portion and partially surrounding the first flanged end, and second arm extending from the mid-body portion opposite the first arm and partially surrounding the second flanged end, wherein the mid-body portion includes a first side wall, a second side wall extending generally parallel to the first side wall, and an end wall extending between the first side wall and the second side wall, and wherein a tab extends radially outward from the mid-body portion of the tamper-indicating device with respect to an axial centerline of the tamper-indicating assembly; and a pin non-removably coupled to the tamper-indicating device, the pin including a pin head and a pin body, the pin head extending into first side wall and the pin body extending across the cavity and into the second side wall such that the first side wall, the second side wall, the end wall, and the pin body collectively surround the body of the closure bolt.

2. The tamper-indicating system as in claim 1, wherein the pin is oriented generally perpendicular to the tab.

3. The tamper-indicating system as in claim 1, wherein the tab defines a recessed surface.

4. The tamper-indicating system as in claim 1, wherein the first arm at least partially surrounds the first flanged end and the head of the closure bolt.

5. The tamper-indicating system as in claim 1, wherein the first arm includes an axial portion and a radial wall, the radial wall preventing axial movement of the closure bolt.

6. The tamper-indicating system as in claim 5, wherein the second arm includes a radial portion that at least partially surrounds the second flanged end and the body of the closure bolt, wherein the radial wall of the first arm and the radial portion of the second arm are axially spaced apart such that the first flanged end, the second flanged end, and the head of the closure bolt are disposed between the radial wall and the radial portion to prevent movement of the closure bolt when the tamper-indicating assembly is coupled to the drum enclosure assembly.

7. The tamper-indicating system as in claim 1, wherein the mid-body portion is generally U-shaped.

8. The tamper-indicating system as in claim 1, wherein the tab extends from the end wall and away from the drum enclosure assembly.

9. The tamper-indicating system as in claim 1, wherein the tamper-indicating device defines a bore having an annular retention wall, the pin extending through the bore.

10. The tamper-indicating system as in claim 9, wherein the pin includes a fin extending towards the retention wall and configured to engage the annular retention wall upon removal of the pin.

11. The tamper-indicating system as in claim 10, wherein the fin extends from the pin head.

12. The tamper-indicating system as in claim 11, wherein the pin head defines an aperture extending at least partially along an axial centerline of the pin.

13. The tamper-indicating system as in claim 1, wherein the first arm includes a first axial portion and a radial wall, the first axial portion extending from the end wall and the first side wall of the mid-body portion to the radial wall, and wherein the second arm includes a second axial portion and a radial portion, and wherein the second radial portion extends from the end wall of the mid-body portion to the radial portion.

14. A method of applying a tamper-indicating device to a drum enclosure using a robotic system, the drum enclosure including a drum body, a lid, a lid ring extending from a first flanged end to a second flanged end, the lid ring securing the lid to the drum body, a closure bolt having a head and a body extending through the first flanged end and the second flanged end, the method comprising:

gripping a tab of the tamper-indicating device with a gripping assembly of the robotic system;

positioning the tamper-indicating device such that it at least partially surrounds the closure bolt by moving the gripping assembly with the robotic system, the tamper-indicating device defining a cavity sized to receive at least a portion of the closure bolt and a bore, wherein the tamper-indicating device includes a mid-body portion, a first arm extending from the mid-body portion and partially surrounding the first flanged end, and second arm extending from the mid-body portion opposite the first arm and partially surrounding the second flanged end, wherein the mid-body portion includes a first side wall, a second side wall extending generally parallel to the first side wall, and an end wall extending between the first side wall and the second side wall, and wherein the tab extends from the mid-body portion of the tamper-indicating device; and inserting a pin with an actuator of the robotic system into the bore, the pin including a pin head and a pin body, the pin head extending into first side wall and the pin body extending across the cavity and into the second side wall such that the first side wall, the second side wall, the end wall, and the pin body collectively surround the body of the closure bolt.

15. The method as in claim 14, wherein the bore further includes an annular retention wall, wherein the pin includes a fin, and wherein the inserting step further comprises inserting the pin with an actuator of the robotic system until the fin engages the annular retention wall.

16. The method as in claim 14, wherein the positioning step further comprises:

positioning the first arm of the tamper indicting device such that it at least partially surrounds the first flanged end and the head of the closure bolt; and positioning the second arm of the tamper-indicating device such that the second arm at least partially surrounds the second flanged end and the body of the closure bolt.

17. A tamper-indicating assembly for a drum enclosure assembly, the tamper indicating assembly comprising:

a tamper-indicating device defining a cavity, the tamper-indicating device comprising a mid-body portion, a first arm extending from the mid-body portion and configured to partially surround a first flanged end of the drum enclosure assembly, a second arm extending from the mid-body portion opposite the first arm and configured to partially surround a second flanged end of the drum enclosure assembly, and a tab extending radially outward from the mid-body portion of the tamper-indicating device with respect to an axial centerline of the tamper-indicating device, wherein the mid-body portion includes a first side wall, a second side wall extending generally parallel to the first side wall, and an end wall extending between the first side wall and the second side wall; and a pin non-removably coupled to the tamper-indicating device, the pin including a pin head and a pin body, the pin head extending into first side wall and the pin body extending across the cavity and into the second side wall.

* * * * *